UNITED STATES PATENT OFFICE.

JESSE G. FALLS, OF MEMPHIS, TENNESSEE.

PROCESS OF TREATING COTTON-SEED MEAL, COTTON-SEED MEATS, AND COTTON-SEED FLOUR.

1,142,243. Specification of Letters Patent. Patented June 8, 1915.

No Drawing. Application filed August 23, 1913. Serial No. 786,279.

*To all whom it may concern:*

Be it known that I, JESSE G. FALLS, a citizen of the United States, residing at Memphis, Shelby County, and State of Tennessee, have invented and discovered certain new and useful Improvements in Processes of Treating Cotton-Seed Meal, Cotton-Seed Meats, and Cotton-Seed Flour, of which the following is a specification.

My invention relates to a process of treating cotton seed "meats," cotton seed meal, or cotton seed flour, for the purpose of producing a palatable and nutritious food product.

The term cotton seed meats designates the raw kernels of the seed; meal is the first product of grinding and flour the product of a further stage of grinding.

Cotton seed meats in their natural state and also cotton seed meal and flour in their natural or partly cooked state have an objectionable flavor and odor which render them unsatisfactory as articles of food, or when used in combination with other food substances. I have discovered that the process of heating or super-heating the cotton seed meats, cotton seed meal, or cotton seed flour, to a high temperature destroys or removes this objectionable flavor and odor and renders the product suitable for use as a food either alone or in combination with other substances.

In my process the cotton seed meats may be subjected directly to the heating process separately or in conjunction with other food products and the flavor and odor thereby eliminated. In my process the cotton seed meal or flour may be taken immediately as it comes from the oil mill and be subjected to the heating process or the meal or flour may be used in connection with other food products and by sufficient degree of heat, the odor and flavor be thus eliminated. In the treatment of the cotton seed meats, meal, or flour, it is heated or super-heated to as great a temperature as possible without burning the same. The temperature employed in the process is 250 degrees F. and above, and the treatment is continued until the product has become free from the natural odor and taste in its raw, or partially raw, state. The greater the temperature used the quicker the odor and taste are removed, leaving the products with a brownish color.

The cotton seed meats, cotton seed meal, or cotton seed flour thus treated may be used either alone as a food product or in combination with other substances to form a highly nutritious and palatable food.

Having thus described my invention, what I claim is:

1. The process of treating cotton seed meats, cotton seed meal, or cotton seed flour to produce a palatable food product, which consists in subjecting said meats, meal or flour to a high temperature sufficient to remove the disagreeable odor and flavor thereof, substantially as described.

2. The process of treating cotton seed meats, cotton seed meal, or cotton seed flour to produce a palatable food product, which consists in subjecting said meats, meal or flour to a temperature sufficiently high to remove the disagreeable flavor and odor of same, substantially as described.

3. The process of treating cotton seed meats, cotton seed meal, or cotton seed flour which consists in first subjecting the meats, meal or flour to a high temperature sufficient to remove the disagreeable flavor and odor of the meats, meal or flour to as great an extent as possible without burning same, and then using same with other food substances to form a food product, substantially as described.

In witness whereof, I have hereunto set my hand and seal at Memphis, Tennessee this 21st day of August, A. D. nineteen hundred and thirteen.

JESSE G. FALLS. [L. S.]

Witnesses:
G. WORTHEN OGEE,
JOHN W. FARLEY.